United States Patent [19]
Smollinger

[11] 3,846,033
[45] Nov. 5, 1974

[54] VIBRATION DAMPED FITTING

[75] Inventor: Carl W. Smollinger, Williamsport, Pa.

[73] Assignee: Bethlehem Steel Corporation, Bethlehem, Pa.

[22] Filed: Sept. 12, 1972

[21] Appl. No.: 288,474

Related U.S. Application Data

[62] Division of Ser. No. 889,381, Dec. 31, 1969, Pat. No. 3,705,445.

[52] U.S. Cl............ 403/220, 24/115 R, 24/135 R, 403/344
[51] Int. Cl............................................. F16b 7/00
[58] Field of Search........... 24/123 R, 114 S, 115 A, 24/123 E, 122.3, 126 R, 135 R; 287/75, 82, 85; 248/58, 358; 339/101, 102, 233; 174/42, 79; 403/23, 41, 344, 220

[56] References Cited
UNITED STATES PATENTS

| | | | |
|---|---|---|---|
| 1,884,036 | 10/1932 | Malone | 174/42 |
| 2,082,566 | 6/1937 | Berndt | 174/79 |
| 2,889,011 | 6/1959 | Weaver | 248/358 X |
| 2,984,441 | 5/1961 | Dalmasso | 174/42 X |
| 3,246,073 | 4/1966 | Bouche et al. | 248/358 R X |
| 3,572,709 | 3/1971 | Risher | 403/23 |
| 3,672,712 | 6/1972 | Davis | 24/122.6 X |

*Primary Examiner*—Bobby R. Gay
*Assistant Examiner*—William E. Lyddane
*Attorney, Agent, or Firm*—Joseph J. O'Keefe; Charles A. Wilkinson

[57] ABSTRACT

A socket type end fitting for wire rope and strand is provided with a plastic damper body secured about the strand adjacent to the fitting to dampen vibrations in the strand or rope.

1 Claim, 4 Drawing Figures

PATENTED NOV 5 1974 3,846,033

VIBRATION DAMPED FITTING

CROSS-REFERENCE TO RELATED CROSS-REFERENCES

This application is a division of application Ser. No. 889,381 filed Dec. 31, 1969 now U.S. Pat. No. 3,705,445.

BACKGROUND OF THE INVENTION

This invention relates to the alleviation of fatigue in wire ropes and strands by means of vibration damping and particularly to the provision of vibration damping means on a socket type end fitting.

Wire rope and strand subjected to repeated shock and widely fluctuating loads, such as occurs in large earth moving machinery is often subject to premature failure due to wire fatigue. Fatigue of the wires of the strand is particularly liable to occur at or adjacent to fittings mounted on the strand. This is due to the concentration of stress in the strand adjacent the fitting due to repeated torque and sinusoidal vibrations caused by repetitive cycles of loading and unloading.

Various expedients have been resorted to in the past to decrease such vibrations but none to the present inventor's knowledge has been particularly successful with the exception of the damper previously disclosed in the present applicant's application Ser. No. 807,635, filed Mar. 13, 1969, now U.S. Pat. No. 3,549,183 granted Dec. 22, 1970.

SUMMARY OF THE INVENTION

In accordance with the invention a metallic end fitting such as a hot metal socket type fitting or a compression type fitting has mounted upon the end thereof and secured or molded in intimate contact with the surface of a cable upon which the fitting is mounted, a plastic damper body preferably in the shape generally of a cone tapered away from the fitting. This plastic damper body or cone damps out vibrations in the strand and allows the tensional forces in the strand to be evenly transferred into the metallic body of the fitting.

The damper assembly disclosed in application Ser. No. 807,635 is particularly effective with, though not limited to use with, large diameter wire ropes. The applicant's present damper arrangement has been found particularly effective with, though by no means limited to use with, smaller diameter wire ropes.

The subject matter of the present divisional application is directed particularly to the provision of a plastic damper body which is particularly suitable for field installation either as a temporary or permanent part of the end fitting.

DESCRIPTION OF THE PREFERRED EMBODIMENTS

Figure 1:
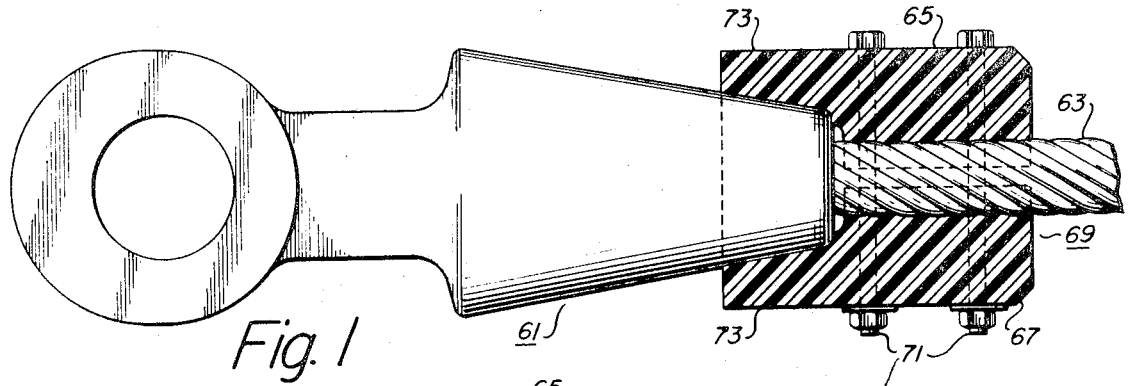
FIG. 1 is a longitudinal view of one embodiment of the plastic damper arrangement of the invention.
Figure 2:
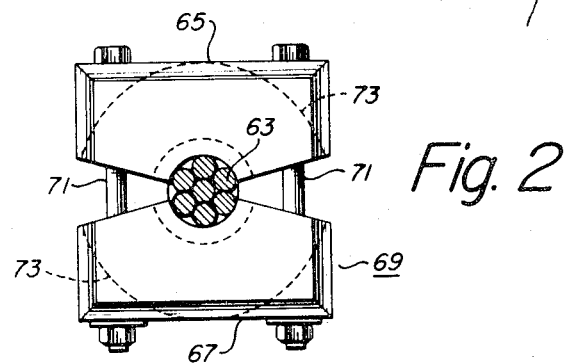
FIG. 2 is an end view of FIG. 1.

A zinc socket type end fitting 11 is shown in FIGS. 1 and 2 of the present applicant's parent application Ser. No. 889,381. As well understood in the art this fitting has a bowl at one end into which a wire rope or strand is inserted through an orifice in the bottom of the fitting. The individual wires or strands of the strand or rope are partially unlaid and broomed outwardly within the bowl and molten zinc or other suitable molten metal is poured into the bowl around the wires or strands and allowed to solidify.

After the strand or rope is fixed in the socket the lower portion of the socket is placed within a conical mold which is preferably made in two sections. The two sections of the mold fit over a flange on the bottom of the socket and define a conical internal mold chamber into which a molten thermoplastic or a thermosetting plastic is poured through an orifice.

Any suitable plastic which is firm, resilient, tough, shock resistant and preferably transparent may be used. A polyurethane plastic has been found particularly suitable. The hardness of the plastic should be between 70 and 95 on the Durometer A scale and will preferably have a hardness of between 80 and 92 on the Durometer A scale. Durometer scale A is substantially identical to the well known Shore A scale and readings on both scales are interchangeable.

After the plastic has solidified or set the mold is removed leaving a conical plastic damper firmly locked to the strand or rope and extending away from the bottom of the fitting. This plastic damper absorbs vibrations in the strand by smoothing them out and allowing the tension of the strand to be evenly transferred to the body of the fitting.

There is also shown in the parent application Ser. No. 889,381 a compression type end fitting having a body portion firmly compressed by swaging or the like upon the end of a strand and a conical plastic damper firmly molded to the strand and extending away from the bottom of the body of the fitting. The compression fitting is adapted to be secured to the strand by force applied over most of the body of the fitting. A plastic cone is subsequently molded over the strand in the same manner as for a hot metal type socket. Since the swaged compression fitting is locked securely to the strand and the plastic cone is also molded or locked intimately to the strand the cone and the fitting are firmly secured together in intimate contact with each other through the strand. As vibrations in the strand arrive at the plastic cone their amplitude is decreased and their energy dissipated in flexing and compressing the cone before the vibrations are passed on to the fitting with decreased energy and amplitude.

For emergency field application it may often be satisfactory if two halves of a plastic body or cone with a half round central groove are placed around the strand adjacent to and preferably tightly abutting a fitting and clamped securely to the strand in intimate contact therewith by any suitable clamping means. In this arrangement the fitting and the plastic cone are both locked to the strand and thus securely fastened to each other through the strand. Preferably the plastic damper body will also be clamped to the nose of the fitting. Considerable vibration is thus absorbed by the plastic cone before reaching the fitting and fatigue of the strand wires near the fitting is considerably reduced. While this embodiment of the invention is not nearly as efficient an arrangement as having the plastic cone intimately molded to the strand it may at times be useful for emergency field application, particularly where the fatigue life of the rope or strand need not be greatly prolonged because the strand is exposed to other deleterious conditions which will cause accelerated failure in any event.

Temporary plastic damper bodies suitable for field application are shown in FIGS. 1 and 2, and 3 and 4. In FIGS. 1 and 2 a conventional molten zinc socket 61 has been previously secured to a strand 63. Two halves 65 and 67 of a plastic damper body 69 formed from a polyurethane plastic and preferably having a hardness on the Durometer A scale of from approximately 90 to 95 have then been secured by bolts 71 about the strand 63 adjacent to socket 61 with flanges 73 extending over and around the nose of the socket in intimate contact therewith. The two halves 65 and 67 of the plastic damper body 69 must be firmly secured to the surface of the strand 63 by tension in the bolts 71. Preferably the inner surfaces of the damper body contacting the strand will be previously contoured to conform to the helical surface of the strand. Flanges 73 are rounded in contour so that a commercial type strapping or the like may be placed about the flanges to clamp them to the nose of the fitting if necessary to obtain an intimate contact between fitting 61 and damper body 69.

Figure 3:
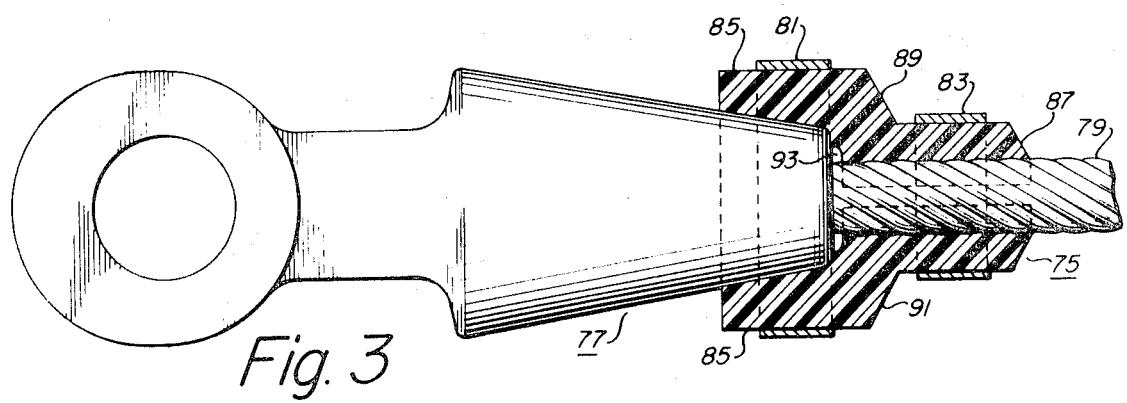
FIG. 3 is a longitudinal view of an alternative embodiment of the invention.
Figure 4:
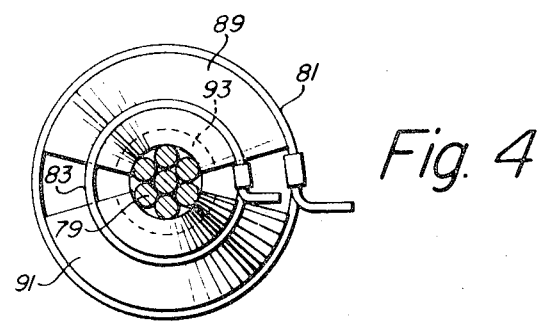
FIG. 4 is an end view of FIG. 3.

In FIGS. 3 and 4 there is shown a second embodiment of a temporary plastic damper body 75 secured about a zinc socket fitting 77 and a strand 79 by means of straps 81 and 83 applied over flange section 85 and nose 87 of two halves 89 and 91 of plastic damper body 75. A small opening 93 may be formed within the plastic damper body adjacent the nose of the fitting to contain lubricant.

While it would be desirable if the temporary plastic damper bodies 69 and 75 were conical in shape they need not be because they are intended to be temporary expedients only and cannot be expected in any event to delay fatigue in the wires of the strand for extended periods. Ease of fabrication and application to the strand in the field may thus outweigh other design considerations. In environments where fatigue occurs very quickly as in some large shovel and crane strands it may be sufficient if by the application of the dampers in the field the strand lasts two weeks or more rather than only a week. A conical damper body intimately molded about the strand as shown and described in parent application Ser. No. 889,381 on the other hand might preserve the strand under the same conditions for as much as a month or more. In each case transverse vibrations in the strand are imparted to the plastic damper body as they progress towards the fitting and are passed on to the fitting with very materially reduced amplitude and energy due to the vibration absorption properties of plastic material having the correct hardness and resiliency properties.

I claim:

1. A vibration damping arrangement for wire cable to damp destructive vibrations in the cable, which vibrations are mechanically induced by shocks and changing tensions in the cable, as the vibrations approach an end fitting on the cable comprising:

a. a metallic end fitting secured to the end of said wire cable, said end fitting having an exteriorly tapered section in which the cable is secured and an attachment section with means to attach the fitting to external structures, the said exteriorly tapered section of said fitting having a decreasing taper, i.e. a decreasing cross sectional area, extending from the attachment section of the fitting to substantially the area of first contact of the fitting with the cable, b. an elongated plastic-damper body preformed in separate sections, said elongated damper body having an internal tapered opening having substantially the same internal dimensions, shape and contour as the external dimensions, shape and contour of the tapered section of the end fitting, said plastic damper body being mounted over at least a portion of the tapered end of the said end fitting with the interior tapered surfaces of said damper body in substantial contact with the exterior surface of the tapered end section of said end fitting, c. the plastic damper body having an orifice extending longitudinally therethrough, the interior surfaces of said orifice being in intimate surface contact with the outer surfaces of the outer wires of the wire cable, adjacent to the smaller end of the tapered portions of the end fitting, d. mechanical compression means to firmly secure the plastic damper body sections about the end of said end fitting and said cable, and e. wherein the plastic of the plastic damper body has a Durometer A hardness of 90 to 95.

* * * * *